June 18, 1940. L. C. JOHNSON ET AL 2,205,203
TRIMMER CONDENSER
Filed March 31, 1937 2 Sheets-Sheet 1

Inventors.
Lawrence C. Johnson
Carther M. Jorgensen
By Williams, Bradbury, McCaleb & Hinkle.
Attys.

June 18, 1940.  L. C. JOHNSON ET AL  2,205,203
TRIMMER CONDENSER
Filed March 31, 1937  2 Sheets-Sheet 2
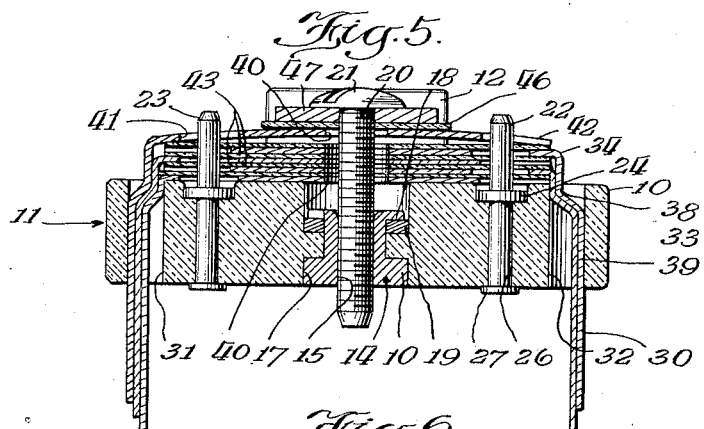
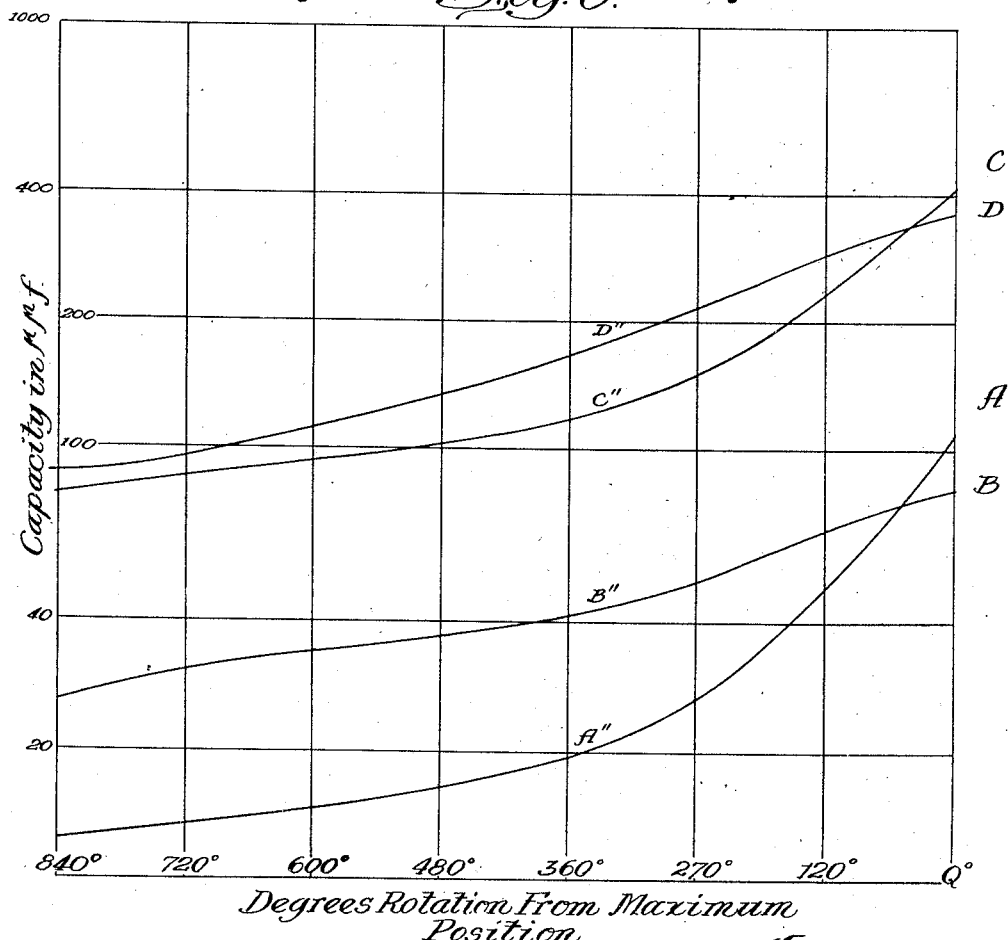
Inventors.
Lawrence C. Johnson
Carther M. Jorgensen
By Williams, Bradbury, McCaleb & Hinkle Attys Patented June 18, 1940

2,205,203

UNITED STATES PATENT OFFICE 2,205,203

TRIMMER CONDENSER

Lawrence C. Johnson and Carther M. Jorgensen, Chicago, Ill., assignors, by direct and mesne assignments, to Underwood Electric & Mfg. Co., Inc., Chicago, Ill., a corporation of Illinois Application March 31, 1937, Serial No. 133,960

4 Claims. (Cl. 175—41.5)

The present invention relates to electrical condensers, and is particularly concerned with the type of condenser which is known as a trimmer condenser, and which is adapted to be used in electrical circuits where a relatively small, adjustable condenser is necessary, as, for example, in a radio receiving set.

One of the objects of the invention is the provision of an improved trimmer condenser, all of the parts of which are adapted to be made by stamping or punching operations, and in which an improved structure permits the attainment of a greater accuracy and stability of the unit.

In the devices of the prior art the condenser plates have been aligned by means of the upwardly projecting integral porcelain lugs carried by the porcelain base of the condenser. Such porcelain lugs were arranged at each end of the condenser plates, and were engaged at opposite edges by the walls of grooves formed in the ends of the respective condenser plates.

Since the porcelain base is formed by a molding operation, it is necessary that any projecting lugs be provided with a taper, and consequently the lugs become smaller at the top and have a greater clearance between each lug and the walls of the groove in the plate, as all of the plates are of uniform size.

It is also impossible to work with very close tolerance where molded porcelain parts are used to fit against other parts, due to the inherent diffculties of moulding parts to accurate sizes.

Since the upper plates, and even the lower plates, do not fit closely around the aligning porcelain lugs, the electrical capacity of the assembly may change when the alignment of the plates changes, and the devices of the prior art are not adapted to vary electrical capacity uniformly, nor to maintain their capacity adjustment as well as devices constructed according to the present invention.

One of the objects of the present invention is the provision of an improved condenser assembly in which the condenser plates are aligned by means of metal pins which permit a much closer alignment of the plates and permit the use of a greater number of plates or what is termed a "higher pile-up" in a trimmer condenser.

Another object of the invention is the provision of an improved trimmer condenser structure in which a closer mechanical tolerance is obtainable in which the stability and other characteristics of the unit are improved.

Another object is the reduction of breakage and waste of mica in the manufacture of such trimmer condensers by the use of an improved structure with which the mica may be made rectangular without any notching at the edge, thereby reducing the loss of mica due to fractures in the punching process.

Another object of the invention is the provision of an improved structure in which the mica may be aligned accurately by means of the smooth pins so that the center hole in the mica, through which the adjustment screw passes, may be made larger than that required to pass the screw, thereby eliminating the possibility of the tearing of the mica by engagement with the screw threads.

Another object of the invention is the provision of an improved condenser structure having more desirable characteristics than the devices of the prior art, by virtue of the structure of the plates.

Other objects and advantages will be apparent from the following description and the accompanying drawings, in which similar characters of reference indicate similar parts throughout the several views.

Referring to the two sheets of drawings,

Fig. 5 is a vertical sectional view, taken on the same plane as the plane 2—2 of Fig. 1, showing a modification with a multiplicity of condenser plates;

Fig. 6 is a view showing the characteristic curves of certain condenser plates of the prior art and those of condensers constructed with a modified form of plates according to the present invention;

Figure 1:
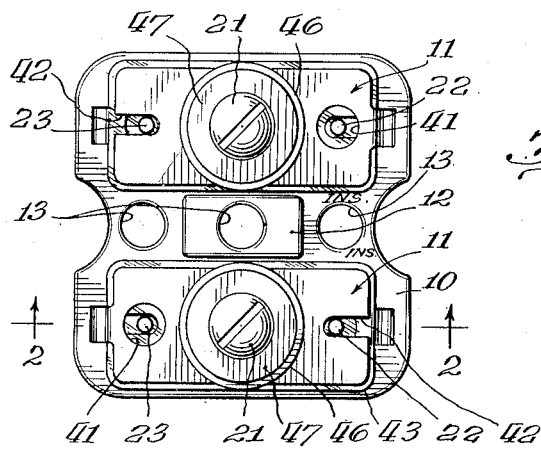
Fig. 1 is a top plan view of a double trimmer condenser constructed according to the invention.
Figure 2:
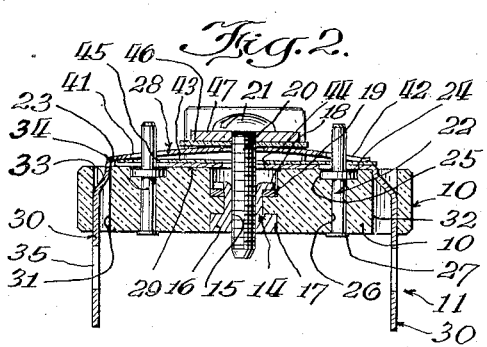
Fig. 2 is a transverse sectional view, taken on the plane of the line 2—2 of Fig. 1, looking in the direction of the arrows, and showing the internal structure of the trimmer condenser.
Figure 4:
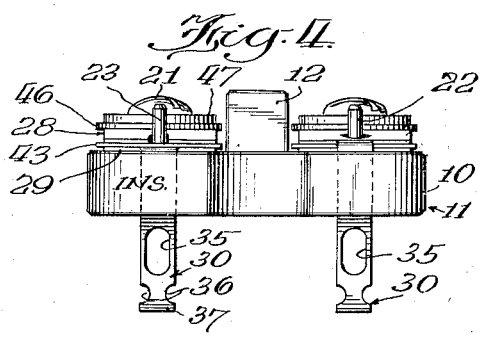
Fig. 4 is an end elevational view, taken from the left end of Fig. 1, showing the trimmer condenser.

Referring to Figs. 1 and 2, it will be observed that the trimmer condenser selected to illustrate the invention comprises a double condenser unit having two condenser assemblies mounted upon one block. It should be understood that the present condensers may be supplied in single units, double units, or in banks of condensers of any number. Where banks of condensers are employed, the condenser plates are all supported upon a single trip of insulating material 10, each of the condenser units being indicated in its entirety by the numeral 11.

In such case, the additional units are merely duplicates of each other, and therefore only one of the units need be described in detail. The insulating support 10 may comprise a strip of insulating fiber such as "Bakelite" or a block of porcelain, or any desirable supporting material. The block illustrated in Fig. 1 is of porcelain, and it comprises a substantially rectangular block, the two parts of which are separated by an upwardly projecting lug 12, located in the middle and provided with an aperture 13 for receiving the securing devices. Other apertures 13 are located at each side of the lug 12. The condenser assemblies 11 are located above and below the upwardly projecting lug 12 in Fig. 1, and the details of their structure may be seen in Fig. 2. For each of these condenser assemblies the insulating support 10 is provided with a centrally located metal threaded member 14 in the form of a sleeve, having a threaded bore 15 and having an outwardly projecting radial flange 16, which is non-circular as viewed from the bottom, such as, for example, hexagonal, so that it may fit into the hexagonal socket 17.

The sleeve 14 is riveted in place by means of the outwardly projecting radial flange 18 at the top, which may be split in several places, and which may engage a suitable fiber gasket 19 to reduce the breakage of the porcelain in the riveting operation. The threaded bore 15 is adapted to receive a screw bolt 20, provided with a head 21, having the usual kerf or slot, and adapted to serve as a means for adjusting the pressure or proximity of the condenser plates.

The supporting body 10 is preferably provided with a pair of metal alignment pins 22, 23, one located at each side of the adjustment screw 20 and preferably centrally located with respect to the edges of the condenser plates which make up the assembly 11.

These alignment pins comprise substantially cylindrical metal members which are provided with a radially projecting flange 24 between the ends of the pin and adapted to be received in a complementary cylindrical socket 25 which communicates with the bore 26 for receiving the lower end of the pin. The extreme lower end of the pin is riveted over at 27 in such manner that the porcelain is clamped between the riveted-over portion 27 and the radial flange 24, thereby fixedly securing the pins 22, 23 in the porcelain. These pins may be made accurately cylindrical or of any suitable shape or section, but, being made of metal, much closer tolerance is permissible than by the use of porcelain alignment lugs. Such pins do not need to be tapered like the porcelain lugs which are molded, and therefore the pins may not only fit the lower plates, but the upper condenser plates, very accurately. The alignment pins need not necessarily be made of metal, but may also be made of other materials capable of being worked to a close tolerance, and may comprise insulating rods, fiber pins, Bakelite pins, or other suitable materials.

Where tapered porcelain lugs were used, the upper condenser plates had an increased clearance with respect to the lugs over the clearance of the lower condenser plates.

The condenser plates of the assemblies of Figs. 1 and 2 comprise two different types of plates, the upper plate 28 and the lower plate 29. In one respect both of these plates are the same. Each plate comprises a substantially rectangular piece of sheet metal, such as spring steel or spring bronze or spring brass, which has at one end a downwardly projecting connector flange 30.

These connector flanges comprise narrow strips of sheet metal adapted to project through the rectangular apertures 31 or 32, which are located for them at each end of the porcelain block 10, and to project for a considerable distance below the porcelain block 10, to permit the attachment of electrical conducting wires.

Each connector strip 30 is preferably provided with an offset 33 just below the right angle bend 34 which connects the strip 30 to the body 28 or 29, and each connector strip may be formed with an aperture 35 through which the wire may be passed, so that it may be more conveniently secured by twisting or soldering.

Another formation for facilitating securement to wires comprises the inwardly projecting grooves 36 adjacent the end of each connector strip 30, which forms the end with something approximating a head 37. Any suitable form of connector strip 30 may be used in the present condensers.

The offset 33 in the condenser plate serves to provide the connector strip 30 with two substantially parallel portions 38, 39, each of which may engage one of the walls of the rectangular apertures 31 or 32, thereby definitely positioning the condenser plate with respect to the porcelain block 10 in a direction longitudinally of the plate 28 or 29.

Each condenser plate is preferably provided with an enlarged centrally located aperture 40 for passing the adjustment screw 20 without any possibility of contact between the edge of the condenser plate and the screw. Each condenser plate is also provided at the end adjacent its connector strip 30 with an enlarged aperture 41 for passing the upper end of the pin 22 or 23 without contact.

The condenser plate is aligned in so far as the lateral movement is concerned, at that end of the plate, by means of downwardly projecting connector strip 30, which is of such width that it fits in the rectangular aperture 31 or 32 in the porcelain block 10.

The end of each condenser plate opposite the connector strip 30 is aligned by means of the pin 22 or 23, and for this purpose each condenser plate has at that end an inwardly projecting narrow slot 42, which slidably fits over the pin 22 or 23, and thus each condenser plate is maintained in alignment with the others at that end by means of the pins 22 or 23. The upper and lower condenser plates 28, 29 are oppositely arranged; that is, each has its connector strip 30 at the opposite end of the block 10.

The lower condenser plate 29 lies directly upon the upper flat surface of the porcelain block 10, and is held in alignment by its connector strip 30 and the pin 23. An insulating sheet of mica 43 is next placed upon the pins 22, 23, and this sheet has an enlarged aperture 44 about the screw bolt 20 and relatively small apertures 45 fit about each of the pins 22, 23.

The insulating sheet of mica is thus accurately aligned by both metal pins 22, 23, and since it may have an enlarged aperture about the screw bolt, there is no danger of the tearing of the mica by the threads of the screw bolt. The breakage loss of mica in the manufacture of the device is greatly reduced by being able to provide the mica sheet with punched apertures 45, rather than the enlarged slots which had been used in the prior art for engagement with the porcelain lugs to align the mica sheets.

The condenser plate 28 is next placed on top of the mica sheet 43, and it is held in alignment by its connector strip 30 and by the pin 22. The screw bolt 20 is preferably provided with a mica insulating washer 46, having an aperture for receiving the screw bolt, and, being a disc-like member of sufficient diameter to extend beyond the metal washer 47, which is also upon the screw bolt 20, adjacent the head 21.

The upper condenser plate 28 differs from the lower condenser plate 29 also in the fact that the upper one is bowed upward in the middle, as shown in Fig. 2, whereas the lower condenser plate 29 is flat in Fig. 2. The upper condenser plate thus acts as a spring which is adapted to follow the head 21 upward as the screw bolt 20 is released, up to a certain point, and the upper condenser plate maintains its engagement with the washers 46, 47 and head 21 within the range of its proper adjustment.

As the screw 20 is driven downward in its threaded sleeve 14, the two condenser plates 28 and 29 are brought into closer proximity to each other, although they are always insulated from each other by the mica sheet 43 and by the fact that neither of these plates engages electrically the screw bolt 20.

It should be noted that while each plate engages a pin 22 or 23, the plates are still insulated from each other at this point, since the pin 23, which engages the plate 29, is insulated from the plate 28 by an enlarged aperture 41.

Figure 3:
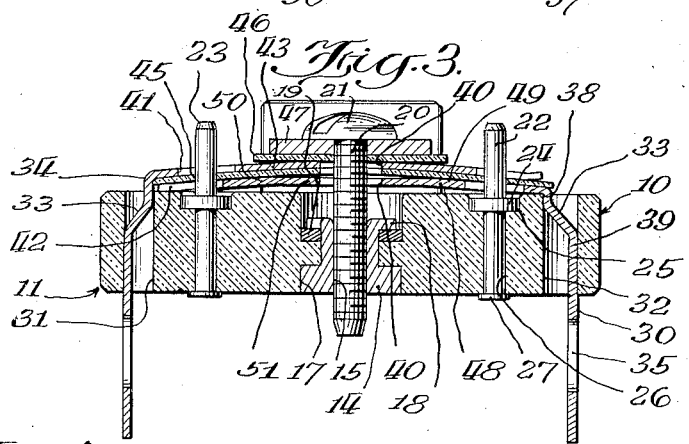
Fig. 3 is an enlarged view similar to Fig. 2, showing a section of another modification, taken on the same plane as that of Fig. 2.

Referring to Fig. 3, this is another modification, which is shown on an enlarged scale, for the reason that it includes an improved form of lower condenser plate. The lower condenser plate 48 in Fig. 3 corresponds in all details to the condenser plate 29 previously described, except that it is not flat, but is provided with a predetermined bent formation, so that it does not lie flatly against the porcelain block 10.

This lower plate 48 has what may be termed two bends or breaks 49 and 50 between what are otherwise flat portions of the plate. The middle portion 51 of the plate is flat, and it extends between the bends 49 and 50.

Figure 7:
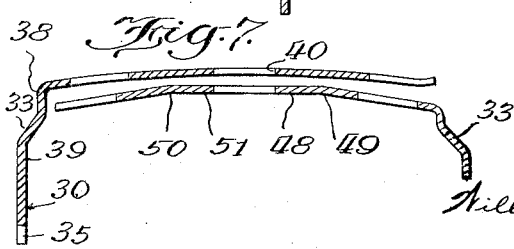
Fig. 7 is a diagrammatic illustration, showing the shape of the condenser plates of Fig. 3.

Each of the end portions of the plate beyond the bends 49, 50 extends downward diagonally at an angle, as shown in Fig. 7, in which the amount of bend is exaggerated for the purpose of illustration.

Referring to Fig. 5, this is another modification, showing a trimmer condenser assembly constructed according to our invention, wherein a multiplicity of condenser plates are used.

In such case, the condenser plates are laid alternately, one upon the other, with the connector extensions nested against each other and located in the apertures 31, 32. The same mica sheets 43 are disposed between each pair of condenser plates, and any of the types of condenser plates described may be used. For example, in Fig. 5, the upper plate only is bowed like the plate 28 of Fig. 2, while all of the lower plates are like the plate 29 of that figure. The effect of placing a multiplicity of plates in a trimmer condenser in this manner is merely to increase the area of the plates, since all of the plates on each side are connected together by the contact of the connector extensions.

Referring now to Fig. 6, this is a reproduction of a chart showing the characteristic curves of various type of trimmer condensers. The curves were plotted on logarithmic paper, the vertical lines of the paper being equally spaced from each other according to a logarithmic scale. The ordinates of these curves are in terms of the capacities in mmfd, while the abscissas of the curves are in terms of degrees of rotation from the maximum position, referring to the rotation of the adjustment screw. The curve A was that of a two plate condenser assembly having a flat bottom leaf of brass (.016) and having the bowed top leaf, as shown in Fig. 2. This curve shows that the curve became rather steep toward the right end, and of course would appear much more steep were it not plotted on logarithmic paper. This is an undesirable characteristic, as it is preferable that the capacity should vary uniformly throughout the useful range of the trimmer condenser.

The curve B is plotted from data secured by tests upon an assembly of the type shown in Fig. 3, with a special brass bottom leaf of the same stock and of the shape shown in Figs. 3 or 7.

By reference to Fig. 7, it will be seen that as the screw is driven downward the medial flat portion of the lower plate and the middle of the upper plate are drawn together first. But little effect is produced at this time by the downwardly extending diagonal portions of the lower plate because they are too widely spaced from the upper leaf. After the middle portions of the plates are in close contact with each other, then the ends begin to be drawn together gradually, and it is found that by means of such a structure a very desirable characteristic can be secured in such a trimmer condenser.

The curve C was plotted from data comprising a four plate condenser of the type of Fig. 2, with three flat bottom leaves and one bowed upper leaf. This curve shows the same tendency toward steep slope at the right end, which is not desirable.

The curve D was plotted from data secured by the test of the same assembly, except that the specially formed leaf of the structure of the lower leaf of Fig. 7 was substituted for the bottom leaf of the condenser used on curve C. In this case it will again be observed that the curve becomes more nearly straight, and the capacity varies more nearly according to a straight line formula, which is a very desirable characteristic, since uniformity of sensitivity of adjustment may be secured throughout the entire useful range of the condenser.

It will be observed that we have invented an improved trimmer condenser in which the plates 60 may be more accurately aligned than with the devices of the prior art, so that the characteristics of the condenser are improved and the unit is more stable than the prior devices. The leaves may be fitted to their metal guide pins with a greater accuracy than with the prior art devices employing integral porcelain lugs, and consequently the positions of the condenser plates may be more accurately predetermined, thereby assuring better results.

Among other things, the capacity of the trimmer condenser depends upon the relative positions of the condenser plates as well as their areas, spacing, and the dielectric, and therefore it is important that the plates be kept in proper alignment.

With trimmer condensers constructed according to our invention the threaded adjustment screw need not be used for effecting an alignment of the mica sheets, and therefore there is no possibility of the mica being torn by the threads, as the sheets may be provided with an enlarged aperture surrounding the screw.

Furthermore, the mica sheets in this construction may be provided with apertures for receiving the metal pins instead of slots at the ends of the mica, and there is a great deal less possibility of tearing of the mica in the formation of the apertures than there is in the formation of end slots. The latter results in a greater wastage of mica.

Another important feature of the invention is the provision of the bottom plates bent with a flat upper portion and two downwardly extending end portions, which provides the trimmer condensers with improved characteristics, as shown by the exemplary curves.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim as new and desire to secure by Letters Patent of the United States, is:

1. In a trimmer condenser, the combination of an insulating member of porcelain or the like, provided with a centrally located aperture having secured therein a tubular member headed at one end and riveted over at the opposite end, said tubular member being internally threaded, an adjustment screw in said tubular member, and provided with a head, a pair of metal pins carried by said insulating support, said metal pins being fixedly secured to said support on opposite sides of said tubular member, and having upwardly projecting portions for slidably engaging condenser plates, and a pair of condenser plates, each condenser plate having a downwardly extending connector member located in and engaging the walls of an aperture in said insulating support for locating and securing against shift that end of the condenser plate, and each condenser plate having an aperture engaging one of said pins, said latter aperture being located at the end of the condenser plate opposite from the connector, and said condenser plates having enlarged apertures surrounding said pins adjacent the connector end of each condenser plate.

2. In a trimmer condenser, the combination of an insulating member of porcelain or the like, provided with a centrally located aperture having secured therein a tubular member headed at one end and riveted over at the opposite end, said tubular member being internally threaded, an adjustment screw in said tubular member, and provided with a head, a pair of metal pins carried by said insulating support, said metal pins being fixedly secured to said support on opposite sides of said tubular member, and having upwardly projecting portions for slidably engaging condenser plates, and a pair of condenser plates, each condenser plate having a downwardly extending connector member located in and engaging the walls of an aperture in said insulating support for locating and securing against shift that end of the condenser plate, and each condenser plate having an aperture engaging one of said pins, said latter aperture being located at the end of the condenser plate opposite from the connector, and said condenser plates having enlarged apertures surrounding said pins adjacent the connector end of each condenser plate, said metal pins being formed with an annular shoulder intermediate the ends thereof, engaging the top of said insulating member, and being riveted over below said insulating member at the opposite end of said pins.

3. In a trimmer condenser, the combination of an insulating support with an electrically conducting condenser plate carried by said support, said plate being provided with a connector extension extending transversely to the plate and adapted to be received in a socket in said insulating support to align one end of said plate, said extension having a fixed frictional fit in said socket and said insulating support having a fixed outwardly projecting metallic aligning member slidably engaged by parts of said plate, said outwardly projecting metallic aligning member comprising a cylindrical pin having a close sliding fit with said plate, and said pin having metallic shoulders arranged on both sides of said insulating support whereby the pin is fixedly secured to said support.

4. In a trimmer condenser having improved characteristics of stability against mechanical shock, temperature change, and change of capacity due to various reasons during lapse of time, comprising the combination of an insulating support with a plurality of compactly stacked condenser plates carried by said support, each of said condenser plates comprising a central body portion provided with a clearance aperture for a screw and a clearance aperture for a pin, and aligning shoulders for engaging opposite sides of a second pin, the said aligning shoulders being located at one end of said plate, and the clearance aperture for the pin being located at the opposite end of said plate adjacent an integral laterally turned extension of said plate, and predetermined of said plates being oppositely disposed with said lateral extensions extending through apertures in said insulating support, metal pins fixedly carried by said insulating support for engaging the alignment shoulders upon predetermined plates, and passing through clearance apertures in other plates, insulating members between said plates, and a clamping screw having threaded engagement with a part carried by said insulating support for determining the proximity of said condenser plates to each other, said laterally turned extensions of said condenser plates being formed with offsets whereby both sides of apertures in said insulating support are engaged by said extensions to prevent movement of the condenser plates at this end of the plate, whereby the condenser plates are confined and guided for movement toward and from each other with a minimum amount of lateral shifting of one plate with respect to another.

LAWRENCE C. JOHNSON.
CARTHER M. JORGENSEN.